Figure 7:
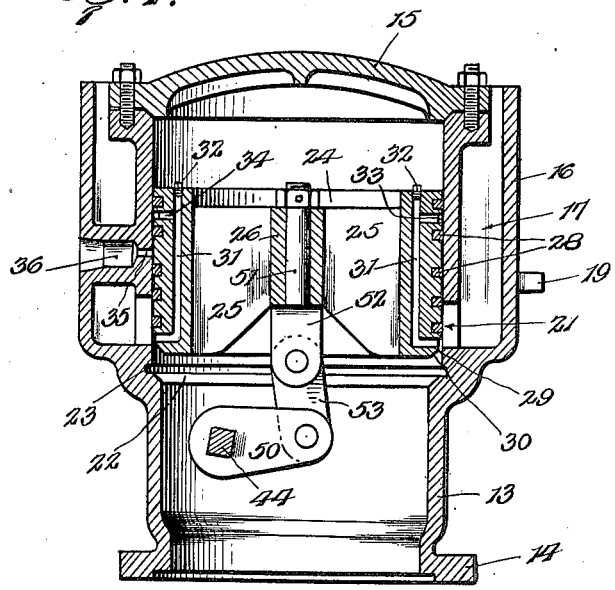

Sept. 23, 1924.                                                         1,509,313
C. E. POWERS
COMBINED THROTTLE AND DRIFT VALVE FOR LOCOMOTIVES
Filed Oct. 22, 1921         4 Sheets-Sheet 1
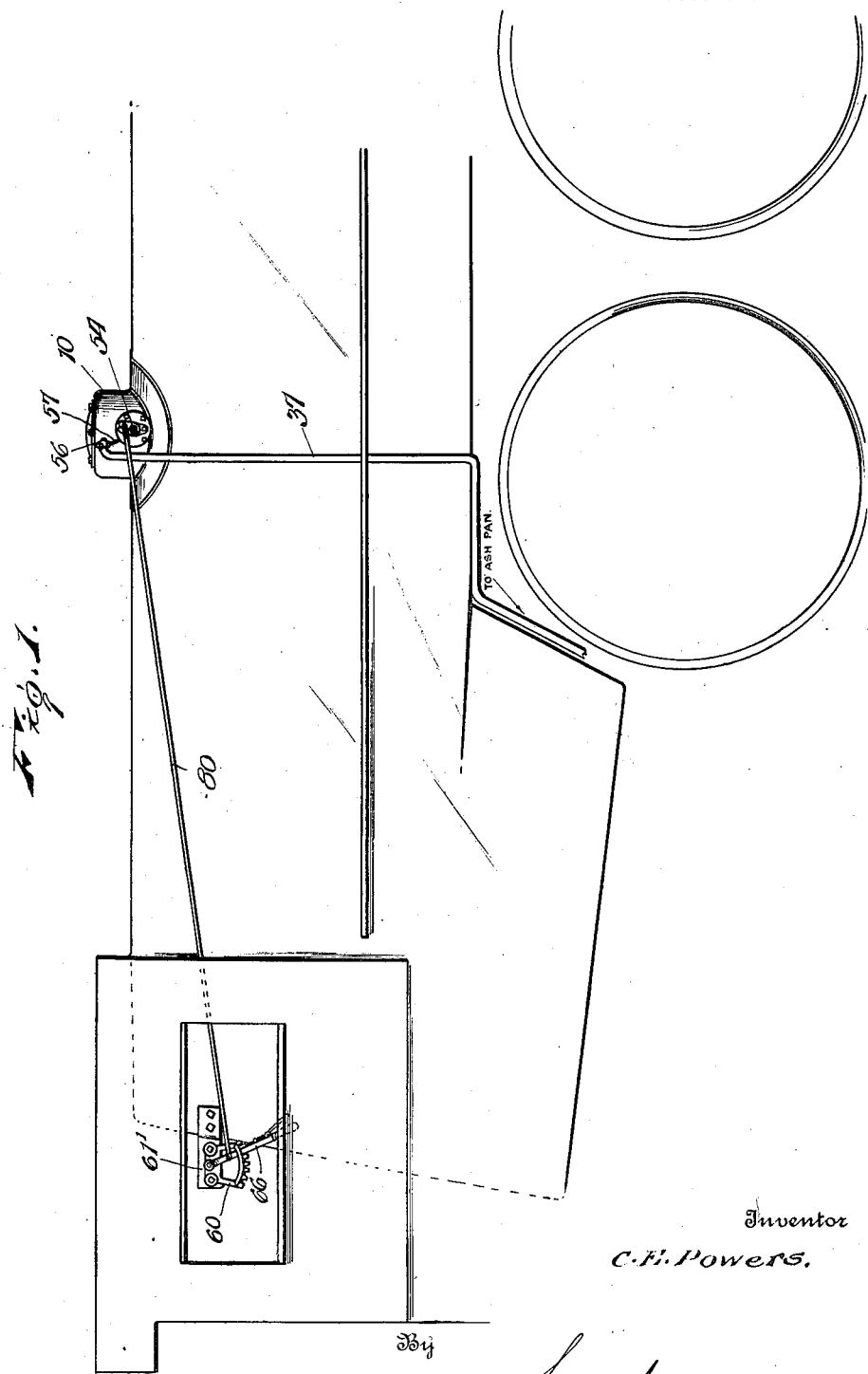
Inventor
C.E. Powers.
By
Lacey & Lacey, Attorneys

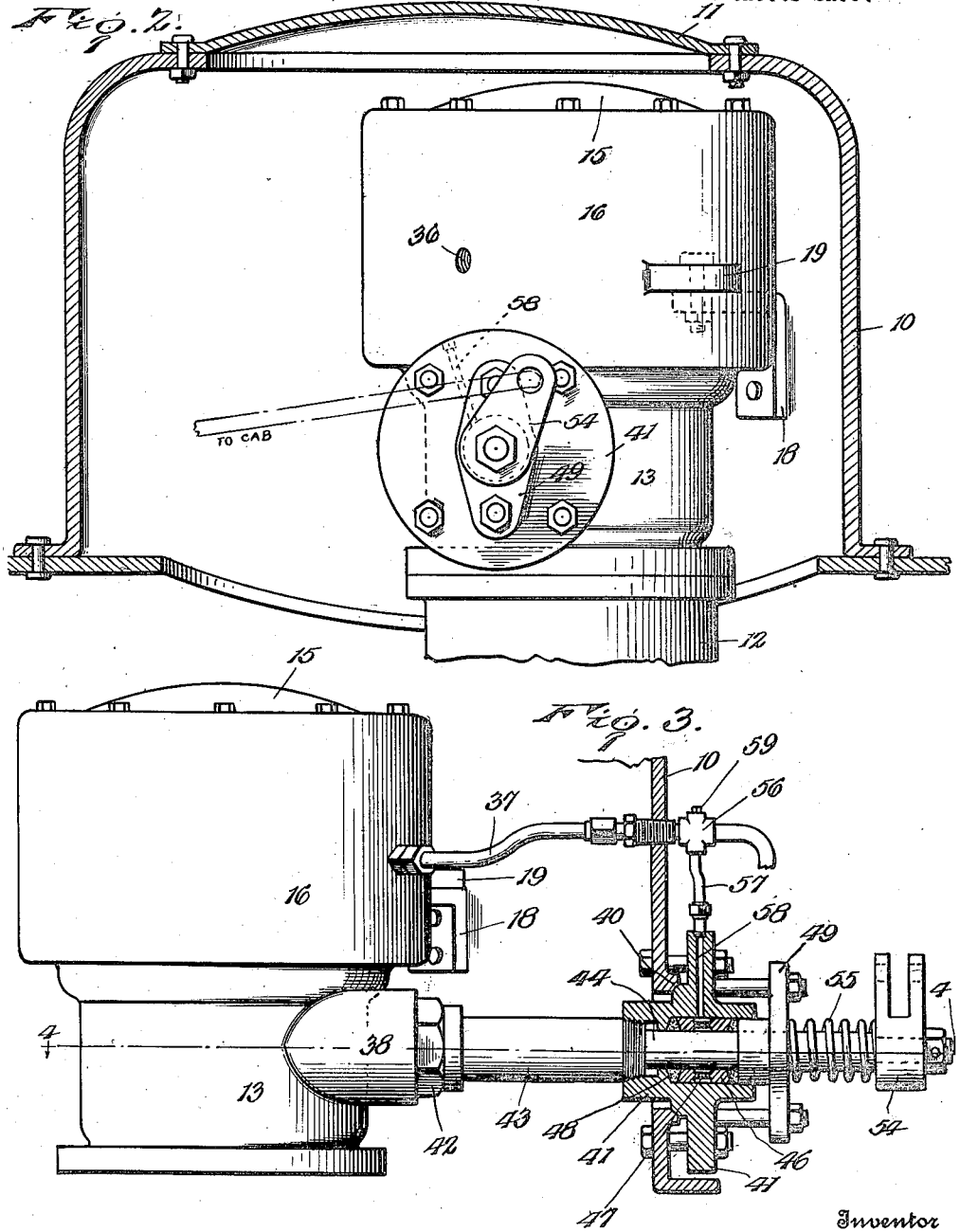

Sept. 23, 1924.
C. E. POWERS
1,509,313
COMBINED THROTTLE AND DRIFT VALVE FOR LOCOMOTIVES
Filed Oct. 22, 1921    4 Sheets-Sheet 3
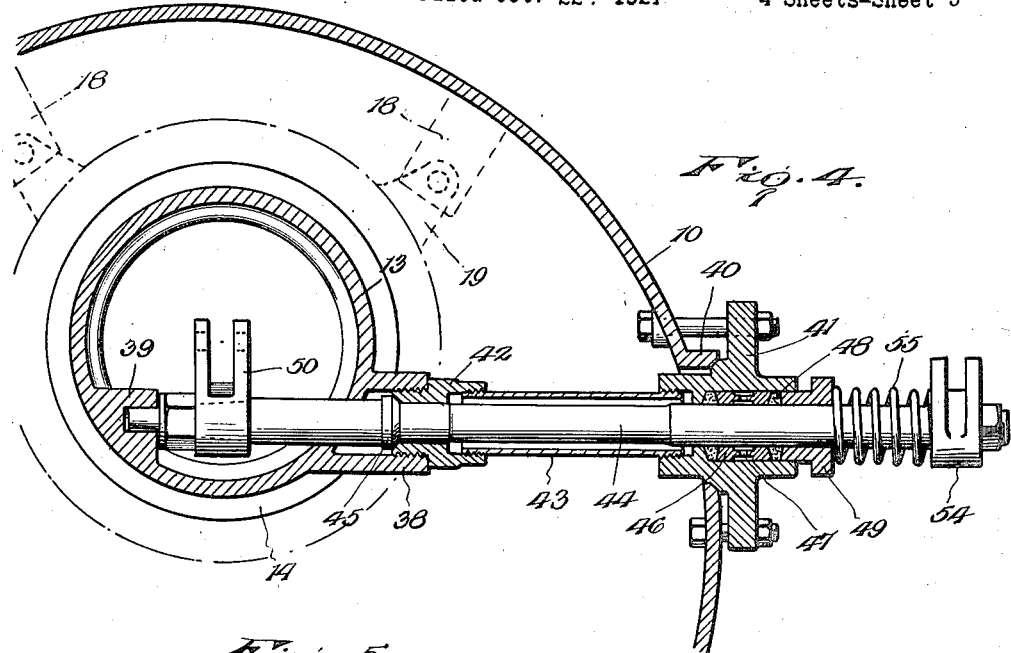
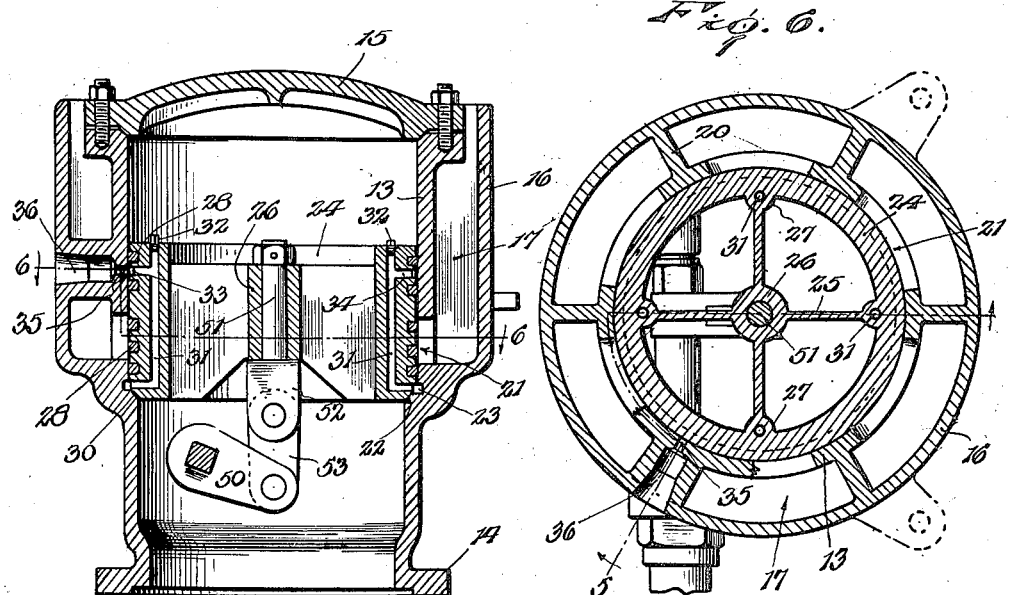
Inventor
C. E. Powers.
By Lacy & Lacy, Attorneys Sept. 23, 1924.

C. E. POWERS 1,509,313

COMBINED THROTTLE AND DRIFT VALVE FOR LOCOMOTIVES

Filed Oct. 22, 1921   4 Sheets-Sheet 4

Inventor
C. E. Powers.

By Lacey Lacey, Attorneys

Patented Sept. 23, 1924.

1,509,313

UNITED STATES PATENT OFFICE.

CLARENCE E. POWERS, OF BALTIMORE, MARYLAND.

COMBINED THROTTLE AND DRIFT VALVE FOR LOCOMOTIVES.

Application filed October 22, 1921. Serial No. 509,507.

*To all whom it may concern:*

Be it known that I, CLARENCE E. POWERS, a citizen of the United States, residing at Baltimore, State of Maryland, have invented certain new and useful Improvements in Combined Throttle and Drift Valves for Locomotives, of which the following is a specification.

This invention relates to a combined throttle and drift valve for locomotives and seeks as one of its principal objects to provide a valve which will be effectually balanced so that the valve may be readily opened or closed.

A further object of the invention is to provide a valve which cannot kick open to cause possible injury to the engineer.

A still further object of the invention is to provide a valve which will not stick.

The invention has a still further object to provide a valve elminating steam leakage into the locomotive cylinders and accordingly eliminating the usual collection of water of condensation in the cylinders.

Another object of the invention is to provide a valve wherein steam leakage will be carried off through suitable bypasses and thus prevented from passing the valve seat.

And the invention has as a still further object to provide a valve wherein steam will be effectually prevented from leaking around the operating shaft of the valve and wherein the stuffing box employed in conjunction with said shaft may be readily oil soaked.

Other and incidental objects will appear hereinafter.

Figure 8:
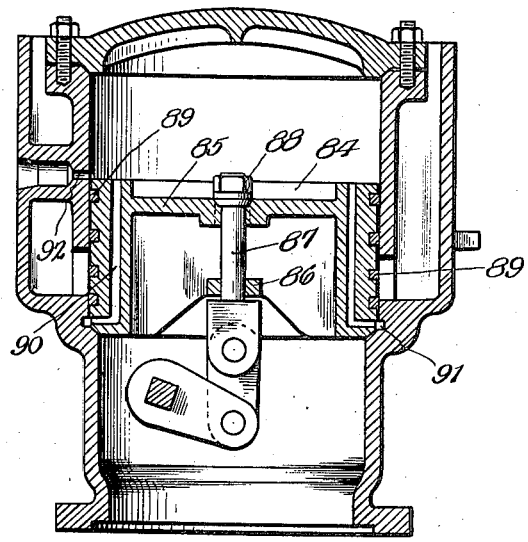

In the drawings:

Figure 1 is a fragmentary side elevation showing my improved valve in conjunction with an ordinary locomotive, Figure 2 is a vertical sectional view taken through the steam dome of the locomotive, the valve being shown in elevation, Figure 3 is a side elevation of the valve, the stuffing box for the valve shaft being shown in section, Figure 4 is a fragmentary horizontal sectional view through the valve on the line 4—4 of Figure 3, looking in the direction of the arrows, Figure 5 is a vertical sectional view on the line 5—5 of Figure 6, looking in the direction of the arrows, Figure 6 is a horizontal sectional view on the line 6—6 of Figure 5, looking in the direction of the arrows, Figure 7 is a vertical sectional view similar to Figure 5, showing the valve in drifting position, Figure 8 is a vertical sectional view similar to Figure 5, showing a slightly modified form of valve.

Referring now more particularly to the drawings, I have, for convenience, shown my improved valve in conjunction with a ordinary locomotive having the usual steam dome 10 closed by a cap plate 11 and leading to the dome is the customary stand pipe 12. Appropriately secured to the stand pipe is the valve of the present invention. The valve includes a cylindrical casing 13 which, as shall presently appear, provides a combined throttle box and balancing chamber and formed on the casing at its lower end is a flange 14 coacting with the stand pipe 12. Closing the casing at its upper end is a cap plate 15 secured by a plurality of stud bolts or other approved fastening devices and integrally formed on the casing to surround the upper end portion thereof is a jacket 16 extending in spaced parallel relation to the casing, the jacket being open at its upper end and defining a steam inlet passage 17 about the casing. In this connection, it is to be observed that in providing the jacket 16, steam will enter the passage 17 from the upper end of the dome. Secured to the dome are, as particularly shown in Figure 4, spaced angle plates 18 and formed on the jacket 16 are lugs 19 bolted to said plate for rigidly bracing the valve casing.

Connecting the jacket 16 with the valve casing are, as particularly shown in Figure 6, a plurality of vertical webs 20 and formed through the wall of the casing at the base of the jacket, between said webs, are inlet ports 21. Below these ports the valve casing is provided with an internal beveled valve seat 22 and formed in the casing at the upper edge of said seat is an annular groove or passage 23.

Reciprocable in the upper end of the casing is an annular valve 24 which is open at its ends and is somewhat smaller than the internal diameter of the casing so as to prevent sticking of the valve. As also particularly brought out in Figure 6, the valve is formed with integral spider arms 25 supporting an axial sleeve 26 and formed on the valve at the base of each of the spider arms is a vertical boss 27. The valve is provided externally with a plurality of ring grooves and removably seated in said grooves are resilient rings 28 coacting with the wall of the casing to provide a closed joint between the valve and casing, five of said rings being preferably employed. Below the lowermost ring, the external diameter of the valve is reduced so that the outer wall of the valve is, as particularly shown in Figure 7, offset as indicated at 29. Formed on the lower end of the valve immediately below said offset is a beveled face 30 adapted to seat flat against the seat 22 of the valve casing. Formed in the bosses 27 of the valve are, as shown in Figures 5 and 6, vertical bypasses 31 closed at their upper ends by plugs 32 threaded into the bosses. At their lower ends these bypasses open through the outer face of the valve at the offset 29 and formed in the outer face of the valve between the uppermost pair of the rings 28 is an annular passage 33 from which lead branch passages 34 opening into the upper end portions of the bypasses 31. Formed through the wall of the casing at one of the webs 20 is a bypass outlet 35 communicating with the passage 33 in the closed position of the valve and entering a bore 36 through said web, the web being thickened to accommodate the bore. Seated in said bore is a bypass pipe 37 which as particularly shown in Figure 3, extends through the wall of the steam dome 10 and is then, as shown in Figure 1, directed downwardly and rearwardly along the side of the locomotive boiler to the ash pan.

Formed on the lower end portion of the valve casing is, as particularly shown in Figure 4, a laterally directed boss 38 and alining with this boss is a bearing 39 within the casing. Suitably formed on the steam dome 10, opposite the boss 38, is a boss 40 and seating in this boss to project into the dome is a stuffing box 41 bolted to the dome. Threaded at one end into the boss 38 of the valve casing is a coupling 42 and extending between the opposite end of said coupling and the inner end of the stuffing box 41 is a pipe 43 threaded at its ends into the stuffing box and said coupling. Extending through the stuffing box, the pipe 43, and coupling 42, into the valve casing, is a valve operating shaft 44 journaled at its inner end in the bearing 39 and formed on the shaft is an annular boss 45 beveled at its outer end to coact with a beveled seat at the inner end of the coupling 42. The boss 45 will thus function as a sealing means to prevent escape of steam around the shaft through the coupling. Surrounding the shaft within the stuffing box is a spool 46 having a series of openings 47 therein and arranged at each end of the spool is a packing 48, the stuffing box being closed by a plate 49. Fixed to the shaft 44 at its inner end is a yoke 50 and extending through the sleeve 26 of the spider of the valve is a rod 51 provided at its lower end with a yoke 52 and extending between this yoke and the yoke 50 is a link 53. Fixed to the shaft at its outer end is a yoke 54 and bearing between this yoke and the plate 49 of the stuffing box is a spring 55 holding the boss 45 to its seat. Interposed in the pipe 37 adjacent the steam dome is, as particularly shown in Figure 3, a four-way coupling 56 and connected at one end to this coupling is a pipe 57, the opposite end of which is in communication with a passage 58 leading into the stuffing box 41. Closing the opening of said coupling opposite the pipe is a plug 59. Thus, should the packings 48, valve 24, or rings 28 become dry, this plug may be removed when oil may be introduced through the pipe 57, passage 58, and openings 47 in the spool 46 to saturate the packings while oil may also be introduced through the pipe 37 and outlet 35 for lubricating the valve and rings.

As will now be understood in view of the preceding description, the shaft 44 may be rocked for opening and closing the valve 24. When the valve is closed the valve will, as shown in Figure 5, overlie the ports 21 while the face 30 of the valve will engage the seat 22 of the valve casing for effectually cutting off flow of steam through said ports. As will be observed, one of the rings 28 will, when the valve is closed, be disposed below the plane of the ports for cutting off downward flow of steam around the valve while a pair of the rings will be disposed above the plane of the ports for cutting off upward flow of steam around the valve. However, particular attention is directed to the fact that should any steam leak past the lowermost ring, such steam will enter the passage 23 of the valve casing and will thence, following the course of least resistance, flow through the bypasses 31 and 34 into the passage 33 of the valve, whence the steam will flow out through the outlet 35 to discharge through the pipe 37. Similarly, any steam leaking past the upper rings of the valve will enter the passage 33 and, following the course of least resistance, will thence flow out through the outlet 35 to also discharge through the pipe 37. Thus, steam will be effectually prevented from passing the valve to enter the locomotive cylinders and cause the collection of water of condensation therein. Steam leaking past the boss 45 of the shaft 44 will be directed through the pipe 43 into the stuffing box 41 and, following the course of least resistance, will thence be carried off through the pipe 57 to discharge through the pipe 37. Leakage of steam at the outer end of the stuffing box will thus be overcome.

When the valve 24 is opened by being shifted upwardly to uncover the ports 21, steam will then flow downwardly through the passage 17, through said ports into the valve casing to enter the stand pipe 12. When the steam enters the casing, the steam will, of course, rise through the valve to exert an equal pressure against opposite ends thereof so that the valve will thus be effectively balanced. Accordingly, the valve will be prevented from kicking open while, at the same time, the valve may be readily shifted for opening or closing the valve. In Figure 7, the valve is shown in drifting position. In this position of the valve the ports remain covered and the upper edge of the valve face 30 is disposed at the plane of the bottom walls of the ports 21, the offset 29 in the outer wall of the valve providing clearance between the valve casing and the valve. Thus, while the ports remain covered a restricted volume of steam will be permitted to flow through the ports past the lower end of the valve into the casing and thence into the stand pipe 12 to enter the cylinders, the volume of steam admitted to the cylinders in the drifting position of the valve being sufficient to prevent smoke box gases from being drawn into the cylinders.

Mounted in the locomotive cab is, as shown in Figure 1, a throttle lever 66 and associated with said lever is a segment 60 bolted to a bracket 61' projecting rearwardly from the locomotive firebox, the lever being provided with a latch to cooperate with the segment for securing the lever in adjusted position. Extending between the lever and the yoke 54 of the throttle valve operating shaft 44 is a rod 80 operatively connecting the lever with the throttle valve.

In Figure 8 of the drawings, I have illustrated a slight modification of the invention. In this modification, the throttle valve, indicated at 84, is closed near its upper end by a head 85 in which is formed an axial valve seat and slidable through said head as well as through a spider 86 upon the valve is a rod 87 upon the upper end of which is threaded a pilot valve 88 to cooperate with said seat. The valve is preferably equipped with four rings 89, and the passage 33, as illustrated in connection with the preferred construction, is eliminated. Bypasses 90 are formed in the valve to open through the upper end thereof, the bypasses 90 corresponding to the bypasses 31 of the preferred construction and communicating at their lower ends, in the closed position of the valve, with an annular passage 91 corresponding to the passage 23. The bypass outlet from the casing is indicated at 92, this outlet corresponding to the outlet 35. Otherwise, this modified form of the invention is identical with the preferred construction and, as will now be seen, when the rod 87 is shifted upwardly the pilot valve 88 will first be opened, when the throttle valve 84 will then be lifted. Accordingly, steam admitted past the throttle valve will, since the pilot valve has been previously opened, be permitted to flow through the head 85 for balancing the valve while, when the valve is closed, any steam leaking past the lowermost of the rings 89 will enter the passage 91 to thence flow out through the bypasses 90 and outlet 92.

Having thus described the invention, what is claimed as new is:

1. A throttle valve including a casing having a steam inlet port and provided with an internal valve seat, a valve normally covering said port and cooperating with said seat, the valve being shiftable away from said seat to uncover the port, and sealing means carried by the valve to cooperate with the casing between said port and seat when the valve is closed.

2. A throttle valve including a casing having a steam inlet port and provided with an internal valve seat spaced below the port, a valve normally cooperating with said seat and covering the port, the valve being shiftable away from said seat to uncover said port, and sealing means carried by the valve to cooperate with the casing between said port and seat when the valve is closed.

3. A throttle valve including a casing having a steam inlet port and provided with an internal valve seat, a valve slidably fitting in the casing normally cooperating with said seat and covering the port, the valve being shiftable away from said seat to uncover the port, and means for bypassing steam entering between the valve and casing when the valve is closed.

4. A throttle valve including a casing having a steam inlet port and provided with an internal valve seat below the port, a valve slidably fitting in the casing normally cooperating with said seat and covering the port, the valve being shiftable away from said seat to uncover the port, and means between the port and seat for bypassing steam entering between the valve and casing when the valve is closed.

5. A throttle valve including a casing having a steam inlet port and provided with an internal valve seat, and a valve slidably fitting in the casing normally cooperating with said seat and covering the port but shiftable away from said seat to uncover the port, the valve and casing being formed with bypasses communicating when the valve is closed for carrying off steam entering between the valve and casing.

6. A throttle valve including a casing having a steam inlet port and provided with an inernal valve seat, a valve slidably fitting in the casing to normally cover said port and cooperate with said seat but shiftable away from said seat to uncover the port, a bypass outlet in the casing, a passage in the casing encircling the valve at one side of the plane of the port between the port and seat, a passage in and around the valve at the opposite side of the plane of the port, and a bypass in the valve opening into the latter passage, the latter passage and said bypass being disposed to communicate one with said outlet and the other with said first mentioned passage in the closed position of the valve.

7. A throttle valve including a casing having a steam inlet port, and a valve slidably fitting in the casing and normally covering said port, the casing being formed with an external steam passage leading from a point adjacent the upper end of the casing to said port.

8. A throttle valve including a casing having a steam inlet port, a valve slidably fitting in the casing and normally covering said port, and a jacket surrounding the casing and providing a steam passage leading from a point adjacent the upper end of the casing to said port.

9. A throttle valve including a casing having a steam inlet port, a valve slidably fitting in the casing and normally covering said port, an operating shaft extending into the casing and operatively coupled with the valve, a stuffing box associated with said shaft, a pipe extending between the casing and stuffing box around the shaft, and means for bypassing steam from the stuffing box.

10. A throttle valve including a casing having a steam inlet port, a valve slidably fitting in the casing and normally covering said port, an operating shaft extending into the casing and coupled with said valve, a stuffing box associated with the shaft, a pipe extending between the casing and the stuffing box around the shaft, a spool within the stuffing box about the shaft, packing at opposite ends of the spool, and means for bypassing steam through said spool from the stuffing box.

11. A throttle valve including in combination with a steam dome, a casing housed by the dome and having a steam inlet port, a valve slidably fitting in the casing and normally covering said port, an operating shaft extending through the wall of the dome into the casing and coupled with said valve, a coupling about the shaft connected to the casing, a boss on the shaft, and yieldable means associated with the shaft exteriorly of the steam dome for holding said boss to coact with the coupling cutting off flow of steam around the shaft through the coupling, said means being exposed to the air to prevent overheating thereof.

12. A throttle valve including a casing having a steam inlet port, a valve slidably fitting in the casing and normally covering said port, means for bypassing steam entering between the valve and casing when the valve is closed, said means including a discharge pipe, an operating shaft extending into the casing and coupled with said valve, a stuffing box associated with the shaft, and means for bypassing steam from the stuffing box including a pipe in communication with said first mentioned pipe.

13. A throttle valve including a casing having a steam inlet port, a valve slidably fitting in the casing and normally covering said port, means for bypassing steam entering between the valve and casing when the valve is closed, said means including a discharge pipe, an operating shaft extending into the casing and coupled with said valve, a stuffing box associated with the shaft, means for bypassing steam from the stuffing box including a pipe in communication with said first mentioned pipe, a coupling connecting said pipes, and a removable plug closing the coupling whereby oil may be introduced through the coupling and through the latter pipe into the stuffing box.

14. A throttle valve including a casing provided at a point between its ends with a steam inlet port, means surrounding the casing defining a steam inlet passage leading exteriorly of the casing to said port, an annular valve slidably fitting in the casing and normally covering said port, and a cap closing the casing at its upper end.

15. A throttle valve including a casing having a steam inlet port, a valve slidably fitting in the casing and normally closing said port, means for bypassing steam entering between the valve and casing when the valve is closed, said means including a discharge pipe, and means interposed in said pipe whereby oil may be introduced into the pipe for lubricating the valve.

16. A throttle valve including a casing having a steam inlet port and provided with a valve seat, and a valve slidably fitting in the casing to normally cover and close said port and provided with a reduced portion having a face to abut said seat limiting the valve in closed position, the reduced portion of the valve being adapted to provide restricted clearance between the valve and the casing when said face is moved away from said seat whereby the valve may be shifted to permit flow of steam through the port past the valve without uncovering the port.

17. A throttle valve including a casing having a steam inlet port and provided with a valve seat, and a valve slidably fitting in the casing and normally covering and closing said port and provided with means out of contact with the casing but having a face to abut said seat limiting the valve in closed position, the valve being shiftable to move said face away from said seat and admit a restricted flow of steam from the port between said means and the casing past the valve without uncovering the port.

In testimony whereof I affix my signature.

CLARENCE E. POWERS. [L. S.]